United States Patent [19]

Scharpf

[11] 4,202,071
[45] May 13, 1980

[54] APPARATUS FOR WASHING AND DRYING PHONOGRAPH RECORDS

[76] Inventor: Mike A. Scharpf, 4624 Buehring Rd., Oshkosh, Wis. 54901

[21] Appl. No.: 888,216

[22] Filed: Mar. 20, 1978

[51] Int. Cl.² ............................................. B08B 5/02
[52] U.S. Cl. ...................................... 15/302; 15/311; 15/405; 134/140; 134/153; 134/199; 274/47
[58] Field of Search ..................... 15/302, 306 A, 310, 15/311, 394, 405; 134/140, 153, 199; 274/47

[56] References Cited

U.S. PATENT DOCUMENTS

| | | | |
|---|---|---|---|
| 3,005,223 | 10/1961 | Taylor et al. | 15/310 |
| 3,401,708 | 9/1968 | Henes | 274/47 X |
| 3,479,222 | 11/1969 | David et al. | 15/302 X |
| 3,518,713 | 7/1970 | Krause | 15/306 A |
| 3,877,107 | 4/1975 | Cirino | 15/405 X |

*Primary Examiner*—Christopher K. Moore
*Attorney, Agent, or Firm*—Andrus, Sceales, Starke & Sawall

[57] ABSTRACT

An apparatus for washing and drying phonograph records including a tank to contain a washing solution, and a phonograph record to be cleaned is mounted vertically for rotation within the tank. The washing solution is drawn in the bottom of the tank by a pump and discharged through jets against opposite faces of the rotating record. Mounted adjacent the jets is a pair of brushes which rotate against the opposite faces of the record to clean the same. After cleaning, air is discharged downwardly from an air tube against the opposite faces of the record to prevent the washing solution from dripping onto the record label and to the dry the record.

5 Claims, 5 Drawing Figures

APPARATUS FOR WASHING AND DRYING PHONOGRAPH RECORDS

BACKGROUND OF THE INVENTION

In order to obtain the proper fidelity it is necessary that dust and other foreign materials be periodically removed from phonograph records. In the past, various devices have been used in an attempt to clean the records. These devices have generally taken the form of brushes, air jets, vacuums and the like. While the devices, as used in the past, have achieved some measure of success in removing loose material from the surface of the record, they have not been capable of removing more adherent materials from the grooves of the record.

SUMMARY OF THE INVENTION

The invention is directed to an apparatus for washing and drying phonograph records which is capable of removing loose and adherent materials from opposite faces of the record during a single revolution of the record. The apparatus includes a tank or container which contains a washing solution and the record is mounted vertically for rotation in the tank above the level of the washing solution.

The washing solution is drawn from a sump in the bottom of the tank by a pump and is discharged through jets against opposite faces of the rotating record. Located adjacent the jet is a pair of vertically mounted rotating brushes which rotate against the opposite faces of the record to clean the faces.

An air discharge tube having a slot to receive the rotating record is positioned adjacent the brushes, in the direction of rotation of the record, and air is discharged downwardly against the opposite faces of the record to prevent the washing solution from dripping onto the label of the record and to dry the record.

The apparatus of the invention is capable of washing and drying the record in one revolution of the record which normally is less than one minute. The apparatus will remove all loose and adherent material from the grooves on the record to restore the original fidelity.

Through use of the washing and drying system, static charge is eliminated from the record so that the record is less receptive to the attraction of dust and other foreign materials.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

The drawings illustrate an apparatus for washing and drying phonograph records which comprises a tank or container 1 having a pair of side walls 2 and end walls 3 which are connected by a bottom wall 4.

Figure 1:
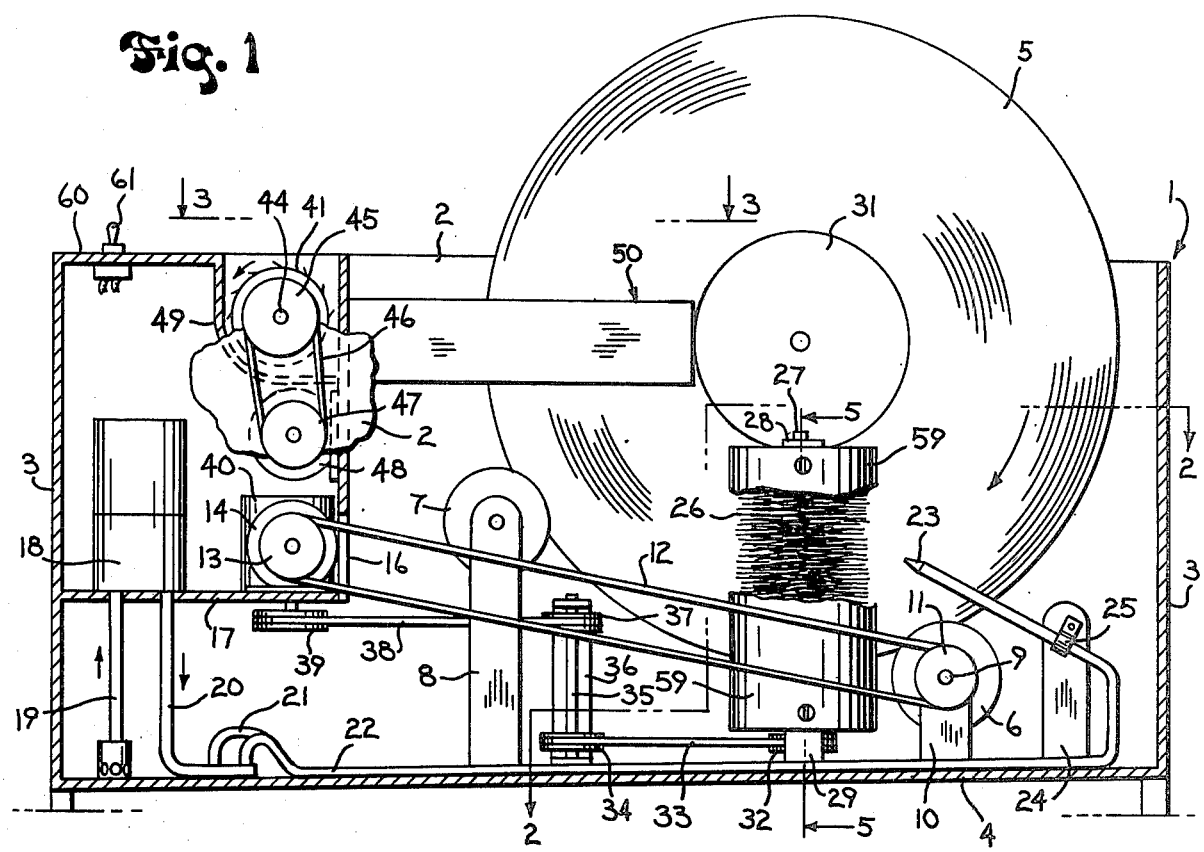
FIG. 1 is a vertical section showing the apparatus of the invention.

A phonograph record 5 to be cleaned is mounted vertically for rotation within the tank 1. As shown in FIG. 1, the record is supported by a V-groove drive roll 6 and a V-groove idler roller 7, and the shaft of idler roll 7 is journalled for rotation within brackets 8 which extends upwardly from the bottom wall 4, while the shaft 9 of the drive roll 7 is journalled within brackets 10. The outer end of shaft 9 carries a pulley 11 which is connected by belt 12 to a pulley 13 mounted on the drive shaft of motor 14. A vertical wall 16 and horizontal wall 17 extend between the side walls 2, and the motor 14 is mounted on horizontal wall 17 a substantial distance above the bottom of the tank 1. With this drive connection, operation of motor 14 acts through the belt drive 12 to rotate the drive roll 6 to thereby slowly rotate the record 5.

Figure 2:
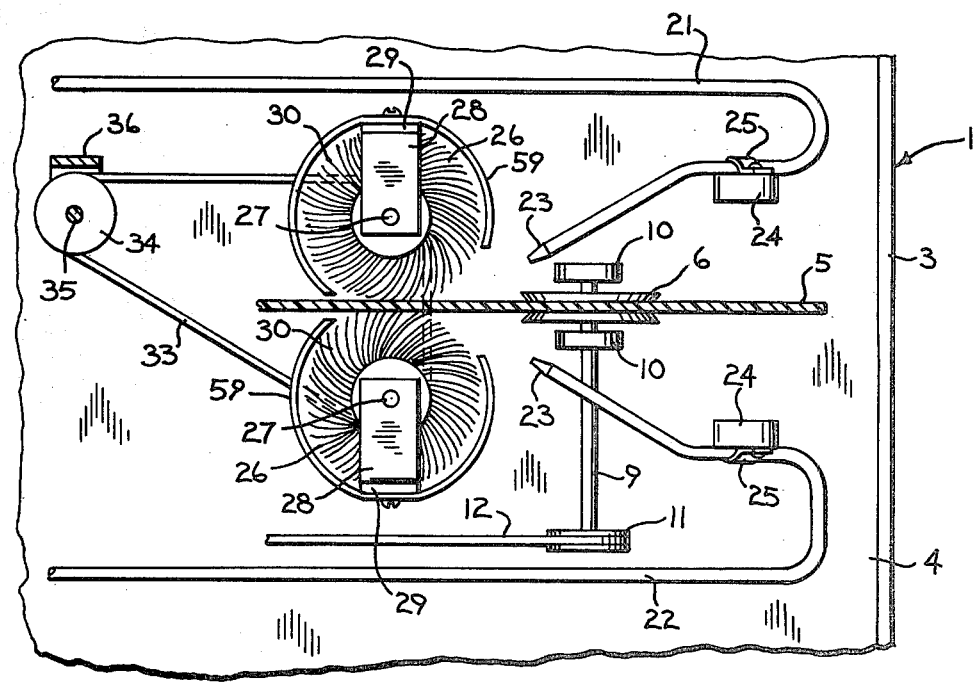
FIG. 2 is a section taken along line 2—2 of FIG. 1.

The tank 1 is adapted to contain a liquid washing solution, and the bottom wall 4 slopes to the left, as shown in FIG. 1, to provide a sump or collection area for the washing solution. A pump 18 is mounted on the horizontal wall 17 and the washing solution is drawn upwardly to the pump through the inlet tube 19 and is discharged through the tube 20. Tube 20 communicates with a pair of tubes 21 and 22 which extend to the opposite end of the tank, and a jet or nozzle 23 is connected to the end of each of the tubes 21 and 22. As shown in FIG. 2, the jets 23 are located on opposite faces of the record 5 and the washing solution is discharged from the jets against the faces of the rotating record.

The tubes 21 and 22 are supported in the tank by means of brackets 24 which extend upwardly from the bottom wall 4 and a clip 25 is secured to the upper end of each bracket and serves to clamp the tube against the respective bracket.

Figure 5:
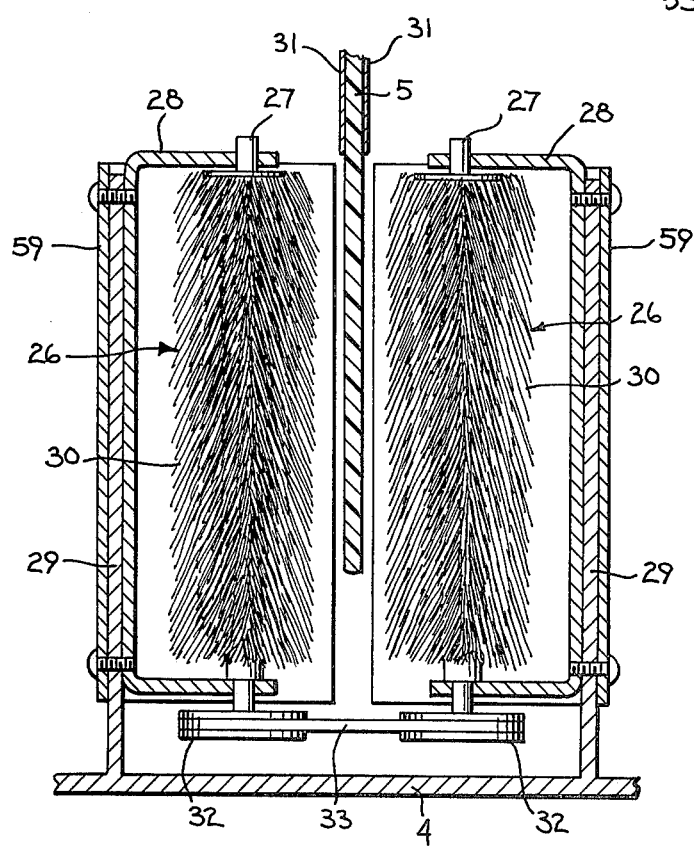
FIG. 5 is a section taken along line 5—5 of FIG. 2.

The opposite faces of the rotating record 5 are cleaned by a pair of vertically mounted brushes 26 which are disposed on opposite sides of the record. As best shown in FIGS. 2 and 5, each of the brushes is provided with a vertical shaft 27, the ends of which are journalled within U-shaped brackets 28 mounted on vertical supports 29 which extend upwardly from the bottom wall 4.

Each brush 26 is provided with a plurality of relatively long, flexible bristles 30, preferably formed of synthetic material. When the brushes are not rotating, the bristles will sag downwardly, as shown in FIG. 5, so that the bristles will be out of contact with the faces of the record. When the brushes are rotated, the bristles will be thrown outwardly by centrifugal force against the opposite faces of the record to clean the same.

As shown in FIG. 1, the upper extremity of each brush terminates immediately below the periphery of the label 31 so that the label will not be contacted with the washing solution or the brushes.

To rotate the brushes, a pulley 32 is connected to the lower end of each shaft 27 and the pulleys 32 are connected by a belt 33 to a pulley 34 mounted on the lower end of shaft 35. Shaft 35 is supported by a bracket 36 mounted on bottom wall 4, and the upper end of the shaft carries a pulley 37 which is connected by belt 38 to a pulley 39 attached to the drive shaft of a motor 40 that is mounted on the horizontal wall 17. Rotation of the motor drive shaft will act through the belts 38 and 33 to rotate the brushes 26.

Figure 3:
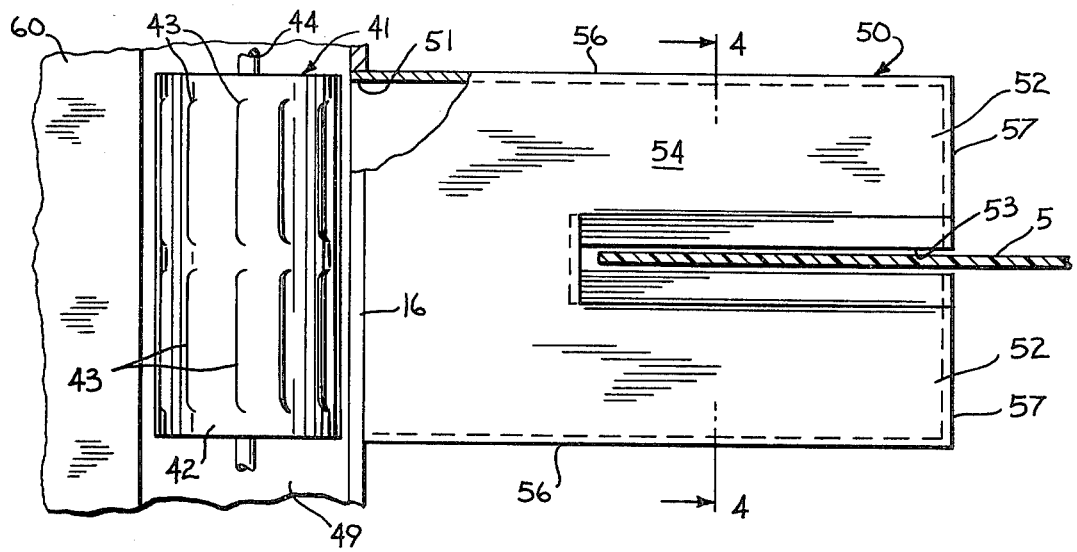
FIG. 3 is a fragmentary top plan view showing the air distribution tube.

As shown in FIGS. 1 and 3, a squirrel cage fan 41 composed of a generally cylindrical shell or drum having a series of angular blades 43 is mounted for rotation within the side walls 2 of the tank. As shown in FIG. 3, the shaft 44 of fan 41 is journalled within the side walls 2 of the tank and one end of shaft 44 carries a pulley 45 which is connected by a belt 46 to a pulley 47 connected to the drive shaft of a motor 48. Operation of the motor 48 will thus rotate the fan 41.

A curved baffle plate 49 extends between the side walls 2 of tank 1 and is spaced outwardly of the periphery of the fan 41, as best shown in FIGS. 1 and 3.

An air discharge tube 50 communicates with an opening 51 in vertical wall 16 and air being discharged from the fan 41 is delivered to the tube 50 and discharged downwardly against opposite faces of the rotating record 5.

Figure 4:
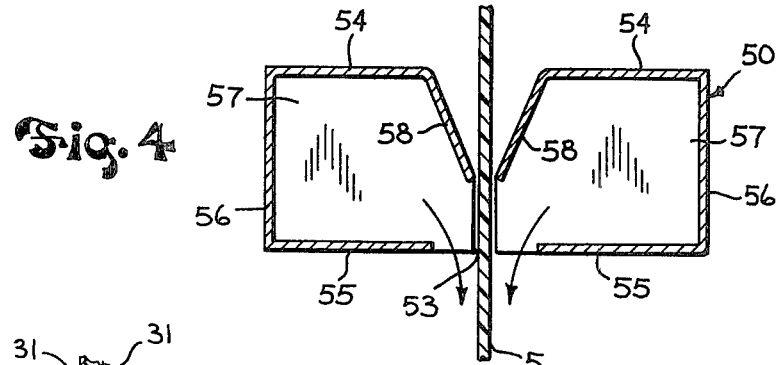
FIG. 4 is a section taken along line 4—4 of FIG. 3.

As best illustrated in FIGS. 3, 4, and 5, the tube 50 includes a pair of spaced parallel arms 52 which define a slot 53 which receives the rotating record. The tube 50 is composed of a top wall 54, bottom wall 55, side walls 56, and end walls 57. Converging flanges 58 extend downwardly from the top wall 54 and define the slot 53. With this construction, air is discharged downwardly through slot 53 against opposite faces of the record at a location extending from the periphery of the record to a point adjacent the label. The downward direction of the air will blow the washing solution downwardly from the face of the record and will dry the record faces. Thus, all of the washing solution will be removed from the record as the washed portion of the record rotates to a position vertically above the label so that no washing solution will drip downwardly across the label 31.

To prevent the washing solution from spraying outwardly curved shields 59 are attached to the brackets 29 and partially surround the rotating brushes 26. The shields 59 prevent the washing solution from spattering outwardly as the brushes rotate.

To operate the various motors 14, 40 and 48, and pump 18, a control plate 60 is mounted across the side walls 2 of the tank and a series of switches 61 are mounted on the plate. Three of the switches act to operate the motors 14, 40 and 48, while the fourth switch operates the pump 18.

In operation, the record 5 is positioned on rolls 6 and 7 and the motors 14, 40 and 48, along with pump 18, are operated to rotate and clean and dry the record. After the record has complete one revolution, the operation of the pump 18 and brush motor 40 is terminated and the rotation and air supply are continued until the last washed section of the record passes through the air drying tube 50. When the brush motor is stopped, the bristles 30 of the brushes will drop downwardly out of contact with the record so that the non-rotating brushes will not wet the record faces.

The apparatus of the invention will wash and dry the phonograph record to remove all dust, grime and foreign materials. By virtue of the construction of the air discharge tube 50, all of the washing solution will be removed from the faces of the record, before the washed portion of the record rotates to a position vertically above the label 32, so that there is no possibility of the washing solution dripping down the face of the record onto the paper label.

The brushes act to remove the loose material, as well as adherent material from within the grooves so that the fidelity of the record is restored. The washing and drying also eliminates the static charge on the record so that the record is less receptive to the attraction of dust.

Various modes of carrying out the invention are contemplated as being within the scope of the following claims particularly pointing out and distinctly claiming the subject matter which is regarded as the invention.

I claim:

1. An apparatus for washing and drying a phonograph record having a central label, comprising a container to contain a washing liquid, means disposed within the container for mounting a record for rotation about a horizontal axis, means for rotating the record, a pair of discharge jets disposed in spaced relation within the container and positioned to direct a washing liquid against opposite faces of the record, pumping means for delivering the washing liquid to said jets, a pair of brushes mounted for rotation about vertical axes and disposed circumferentially in the direction of record rotation from said jets, said brushes disposed to rotate in contact wth opposite faces of the record to clean the same, and air discharge means disposed circumferentially in the direction of record rotation from said brushes and disposed at a level above the jets, said pumping means and said air discharge means being operable simultaneously said air discharge means including an elongated open ended slot to receive the rotating record, said air discharge means being provided with downwardly directed elongated air discharge passages on either side of the slot for directing air downwardly against opposite faces of the record to remove the washing liquid and dry said surfaces and prevent the liquid from dripping downwardly into contact with the label as the record rotates upwardly beyond said air discharge means.

2. The apparatus of claim 1, wherein the brushes have a length substantially equal to the distance between the periphery of the record and the label on the record.

3. The apparatus of claim 1, wherein said air discharge means is disposed approximately 90° from said brushes.

4. The apparatus of claim 1, wherein each brush includes a plurality of flexible bristles, said bristles disposed to hang downwardly out of contact with the respective faces of the record when the brushes are not rotating and said bristles being thrown outwardly by centrifugal force into contact with the faces of the record on rotation of said brushes.

5. The apparatus of claim 1, wherein said air discharge means includes a generally horizontal tube having an inlet end and a pair of spaced generally parallel arms which define said slot, said discharge passages being located in the respective arms adjacent said slot, and said air discharge means including fan means operably connected to said inlet end to deliver air to said tube.

* * * * *